Patented Oct. 24, 1939

2,177,251

UNITED STATES PATENT OFFICE 2,177,251

PROCESS FOR PRODUCING BLENDED PIGMENTS

Marion L. Hanahan, Wilmington, and Rodolphe A. Gagnon, Christiana, Del., assignors to E. I. du Pont de Nemours & Company, Wilmington, Del., a corporation of Delaware No Drawing. Application May 27, 1937, Serial No. 145,045

6 Claims. (Cl. 134—78)

This invention relates to the production of composite pigments, and has particular reference to the production of zinc sulfide-calcium sulfate extended pigments, of very fine particle size and improved and superior over blends heretofore obtainable.

More specifically, the invention contemplates the direct production of composite pigments by admixing a prime pigment such as zinc sulfide with calcium sulfate containing less combined water than correspond to the dihydrate, and concurrent with hydration of said calcium sulfate, subjecting the mixture to relatively high shearing forces.

In the concurrently filed application of Winfield W. Heckert, Serial No. 145,051, filed May 27, 1937, there is described a process for manufacturing fine particle size calcium sulfate in which hydration of calcium sulfate is had during its concurrent subjection to relatively high shearing forces, and in the presence or absence of crystal growth restraining agents.

We have discovered that if the hydration process of Heckert is conducted in the presence of a water suspension of calcined or uncalcined prime pigment, such as zinc sulfide, a highly improved, composite calcium sulfate-zinc sulfide pigment directly results, said pigment being unusually fine in particle size, greatly improved in texture and tinting strength, and superior to composite pigments produced as a result of mere blending of a prime pigment with previously hydrated calcium sulfate.

Additionally, we have found that not only may the direct production of an improved blended pigment be thus had, but the pigments so obtained will be entirely free from grit, as well as other objectionable impurities.

Our discovery also embraces the knowledge that the presence of a prime pigment such as zinc sulfide during hydration of the calcium sulfate is very desirous and advantageous. The zinc sulfide appears to restrain the crystal growth or particle size increase of the hydrate particles of calcium sulfate which are formed, thus obviating necessity of resort to usual restraining agents for the purpose of retarding or inhibiting particle size growth of the initially formed crystals. Furthermore, the presence of the prime pigment during hydration pronouncedly influences the ultimate size of the hydrated product which is obtained, such product being finer and further reduced in particle size than is otherwise the case. This influence or restraint which the presence of the prime pigment appears to exert is in all probability due, we believe, to a chemical influence, although it would appear that the fine primary particles of zinc sulfide are also adsorbed on the surface of the initially-formed and very fine sulfate crystals, thus protecting and inhibiting them against further growth.

In one practical adaptation of our invention, a mixture of calcium sulfate hemihydrate or soluble anhydrite and zinc sulfide is first made up, said mixture being in any desired proportions by weight. This mixture is charged into a suitable milling apparatus, preferably a Banbury mixer, adapted to subject the same, while in a relatively viscous state, to vigorous agitation or kneading. Concurrently with the charge of the mix into the kneader (or subsequently, if desired) water is added, preferably as rapidly as possible and in amounts sufficient to reduce the mass to a relatively soft, plastic or viscous state, whereby on completion of kneading, said mass remains in paste-like or thickened consistency. For the purpose we have found that an amount of water equalling substantially from 3–7 times the weight of the total mixed solids usually suffices, such ratio being also sufficient to maintain the mass at substantially paste-like consistency throughout the 30 minutes of kneading treatment which we contemplate. On completion of water addition, mechanical movement of the mixer is commenced, being permitted to continue until hydration becomes complete. This usually occurs within from 10–20 minutes of kneading, but kneading is preferably continued for at least 30 minutes, at the end of which time mechanical movement is interrupted. The slurry mass is then removed with a minimum of delay from the kneader and subjected to sufficient heat treatment to effect desired drying or calcination of the resultant product. Any conventional and suitable temperature for effecting either drying or calcination may be resorted to, such as, for instance, less than substantially 200° C. to effect drying or 200° C. or higher to effect calcination. Calcination may also be effected at temperatures ranging to as high as 650–980° C.

Alternatively, the slurry mass prior to discharge from the kneader may be further thinned with water, filtered and then subjected to desired heat treatment to effect dehydration. However, whatever the subsequent treatment, the mass is discharged from the kneader preferably as soon and as rapidly as possible, in order that objectionable crystal growth of the fine particles of calcium sulfate obtained may not occur by reason of continued and prolonged water contact. If the total time consumed in removal of the slurry from the kneader to commencement of heat treatment amounts to no more than substantially 30 minutes of time, avoidance of deleterious crystal growth or particle size increase will be found to exist.

In order that the invention may be more clearly understood, the following specific examples are given, each of which is merely illustrative in character and in no wise in limitation of our invention:

*Example I*

80 parts by weight of pigment zinc sulfide were introduced into a conventional kneader. 85 parts by weight of calcium sulfate hemihydrate were introduced and thoroughly mixed with the zinc sulfide. 560 parts by weight of water were then rapidly introduced and while the mixer was in operation. Mixing was continued for about 25 minutes at room temperature, at the end of which time the reaction mass was thick and pasty in consistency.

The hydrated product was removed from the mill by addition of sufficient additional water to render the same mobile and was filtered, then transferred to a dryer without undue delay and dried at about 65° C. As a result of this operation, the particle size average of the calcium sulfate ($CaSO_4.2H_2O$) in the blended product obtained was 1 to 3 microns, as compared with 3 to 7 microns obtainable from separate hydration.

When this same blended product was calcined at temperatures between 200° C. and 900° C., the gypsum particles contained therein disintegrated spontaneously and a superior blended pigment comprising zinc sulfide and insoluble anhydrite resulted. Said anhydrite was practically wholly non-acicular in character and averaged about 1 micron in size.

*Example II*

50 parts by weight of pigment zinc sulphide were intimately mixed with 54 parts by weight of calcium sulfate hemihydrate and charged into a ball mill. 600 parts by weight of water were introduced and the mill was operated for approximately 20 minutes, at room temperature. At the end of 20 minutes' milling the reaction mass was in the form of a thick paste. The consistency of the paste was such as to preclude any important amount of grinding in the ball mill, the pebbles not moving freely through the mass. Sufficient water was introduced into the mill to render the mass mobile after rotating the mill for several minutes. The contents of the mill were then run directly to a rapid filtering device and transferred without delay to the dryer. The total time of handling after removal from the ball mill to the start of the drying time was less than 30 minutes. When dried at temperatures of about 65° C. or less, the blended pigment comprised zinc sulfide and gypsum, the latter having an average particle size of 1 to 3 microns, as compared with an average of 3 to 7 microns as the average particle size of gypsum prepared separately.

*Example III*

Slaked lime of good quality, viz., free of objectionable grit and other impurities such as would affect color adversely, was reacted with sulphuric acid. The resulting precipitated gypsum was entirely unsuited as a pigment extender, the particle size being too large and the characteristic, relatively large acicular gypsum crystals being present to considerable extent.

The precipitated gypsum was filtered and was then dried at between 160° and 180° until the dried product showed a moisture content (chemically combined water) of about 4%.

172 pounds of this dried calcium sulfate were then charged into a kneader type mixer. 192 pounds of calcined zinc sulfide pigment were also introduced into the mixer and the two solids were intimately mixed when the mixer was set into operation. 1000 pounds of water were then introduced while the operation of the mixer was continued. After operation of the mixer for a period of 20 minutes, it was found that the resulting stiff paste contained only the completely hydrated form of calcium sulfate. After further kneading for a period of 5 minutes, additional water was added to facilitate removal from the mixer. After 2 minutes' additional kneading, the mixer charge was filtered rapidly and drying was begun at the earliest practical moment. In this instance a total time of 25 minutes had elapsed from the time of discharge from the mill until the drying operation was started.

When dried at 65° C. or less, the resulting composite pigment was composed essentially of zinc sulfide and gypsum. The zinc sulfide content measured 48%. The gypsum was of excellent fineness, the average particle size being from 1 to 3 microns. The composite pigment was excellent in other respects; free from objectionable grit, of excellent color and tinting strength with other pigment properties normal.

When this same product was calcined the calcium sulfate constituent of the product was substantially entirely in the form of non-acicular, substantially equidimensional particles of about 1 micron average diameter. The composite pigment was of superior tinting strength as compared with composite pigments of equal zinc sulfide content prepared from the same quality pigment zinc sulfide and separately prepared anhydrite.

The blended composite pigment obtained as a result of our invention will be unusually small in particle size and characteristically uniform and fine in texture. Due to its method of manufacture, it will contain no grit or other objectionable impurities, and will exhibit improved and superior tinting strength over blends obtained by the employment of previously hydrated calcium sulfate.

The composite pigment, if dried at relatively low temperatures, say, of the order of 65° C. or less, will retain its calcium sulfate constituent in the form of very fine particle size gypsum. The average particle size of said gypsum will be from 1–3 microns, whereas if said gypsum is prepared in an identical manner and in the absence of the zinc sulfide, the particles thereof would average in excess of 3 microns and range as high as 7 microns. While drying of the product at relatively low temperatures affords the obtainment of a composite zinc sulfide-gypsum pigment, drying at higher temperatures will prove beneficial, since the gypsum crystals spontaneously disintegrate to very fine, non-acicular state, such disintegration becoming complete when calcination temperatures in excess of substantially 200° C. and within 600–950° C. are resorted to. The calcium sulfate constituent of the calcined composite pigment will be in the form of insoluble anhydrite, and comprise substantially equidimensional particles averaging about 1 micron in diameter or less.

While specific ratios of water to total solids in the hydrating mixture have been set out hereinabove to induce desired consistency of mass for subjection to shearing treatment, these ratios are merely illustrative. The optimum ratio of water to solids will usually be best determined by trial and depend somewhat upon the specific type of starting materials employed, such as soluble anhydrite or hemihydrate, or mixtures of the same, as well as the type of milling apparatus utilized. Generally, if the ratio of water to total solids present in the mixture is sufficient to provide a slurry mass ranging in consistency from a substantially creamy to a heavy, dough-like state, such ratio will be found satisfactory for use in the invention. Accordingly, if the ratio of water to total solids is such that after substantially 30 minutes of milling as a batch process, the reaction mixture is still doughy or viscous in consistency, such ratio will likewise be suitable. As has been indicated, we have found and therefore preferably employ an amount of water equal to substantially 3–7 times the weight of the total solids present in the mixture under treatment, although in the majority of instances a ratio of from 5–7 times as much water as mixed solids will suffice to obtain optimum benefits when employing a kneader type of mixer.

As has also been indicated, the amount of water to be employed for obtaining desired mass consistency will also depend upon the type of milling apparatus utilized. While we have described our invention in its particular and preferred adaptation to a kneader type of mixer provided with blades which function to apply our preferred cutting away or shearing action upon the viscous mass under treatment, it is to be understood other types of mixing apparatus may be utilized, provided the particular type is capable of exerting desired high shearing force action upon the viscous mass being subjected to mixing treatment. For instance, other types of apparatus utilizable include a ball mill, a pebble mill, or a pug mill. Where our preferred kneader apparatus is employed, resort to thicker mass consistencies will be found desirable, whereas in instances when apparatus such as a ball mill is utilized, somewhat thinner mass consistencies, even to an extent approximating a somewhat liquid condition, may be utilized. If the consistency of the mass under treatment is too heavy, it will be found in the instance of a ball mill that free movement of the balls will be prevented. The action which a ball mill exerts is essentially one of grinding or attrition, which, we have found, standing alone is not conducive to the obtainment of optimum benefits under the invention, i. e., effecting hydration of the calcium sulfate and production of a blended pigment under such conditions that excessive crystal growth formation of the calcium sulfate is completely prevented. Therefore, in instances where a ball mill type of apparatus is utilized, and in order to obtain optimum benefits under the invention, care should be taken to maintain the mass under treatment at such consistency as to afford mixing of the mass by a predominantly shearing action with only incidental grinding.

As an alternative operation in carrying the invention into effect, the slurry mass prior to discharge from the milling apparatus may be further thinned with water, filtered, and then subjected to the desired heat treatment. Whatever the subsequent treatment, however, the mass is preferably discharged from the apparatus with a minimum of delay in order to avoid continued contact of the fine particles of calcium sulfate obtained, since continued contact of the fine particles with water would induce objectionable crystal growth. Such crystal growth or particle size increase may be effectively prevented if removal and discharge of the slurry from the milling apparatus is accomplished within a time period not to exceed substantially 30 minutes. Therefore, if the total time consumed from commencement of removal of the slurry from the apparatus to commencement of the drying operation does not entail more than substantially 30 minutes of time, it will be found that deleterious particle size growth or increase will be effectively prevented.

Although natural gypsum is utilizable as one form of a starting material for production of hemihydrate or soluble anhydrite, our preferred process entails precipitation of gypsum, as for instance, from milk of lime and sulfuric acid. This gypsum may be then dehydrated to at least the extent represented by the composition of the hemihydrate, and preferably to such extent that it will contain less than 5% of chemically combined water. Such dehydration of the gypsum should be effected at temperatures less than substantially 200° C. and preferably less than 180° C.

Likewise, although our process is adaptable to hydration of calcium sulfate when mixed with uncalcined zinc sulfide, in its more preferred adaptation we employ pigment zinc sulfide as a starting material, i. e., zinc sulfide the pigment properties of which have already been developed, as for instance, by calcination. Similarly, we prefer such pigment zinc sulfide to have an average particle size of not more than .8 micron, as for instance, the product obtained in the process described by M. L. Hanahan in United States Patent 1,826,131.

Although we have described our invention in its applicability to a batch process, it is obvious that it has equal application for use in continuous or semi-continuous processes.

While our invention has been described with particular reference to the production of a composite zinc sulfide-calcium sulfate pigment, production of other types of composite pigments containing calcium sulfate and other prime white pigments, such as antimony oxide, zinc oxide, basic lead carbonate (white lead) etc., is also contemplated. Accordingly, the term "prime white pigment" as here employed and in the appended claims embraces pigments of the character exemplified.

In producing such composite pigments, any desired proportion of prime pigment to calcium sulfate constituent may be utilized. In the production of our preferred zinc sulfide-calcium sulfate pigment, we usually employ a zinc sulfide content ranging from 30–70%, and have found that a particularly high grade type of composite pigment may be obtained when the zinc sulfide content ranges from substantially 40–60%.

We claim as our invention:

1. A process for producing a blended pigment, comprising subjecting calcium sulfate containing less combined water than the dihydrate to hydration in the presence of a water suspension of a prime white pigment, concurrently therewith subjecting the mixture to mechanical shearing action treatment and upon effecting said calcium sulfate hydration and within substantially 30 minutes from completion of said mechanical shearing treatment, dehydrating the resultant product.

2. A process for producing a blended calcium sulfate-zinc sulfide pigment, comprising hydrating calcium sulfate containing less combined water than the dihydrate in the presence of a water suspension of zinc sulfide, during said hydration and while said mixture is in a substantially paste-like state, subjecting the same shearing mechanical treatment and upon effecting said calcium sulfate hydration and within substantially 30 minutes from completion of said mechanical shearing treatment, dehydrating the resultant blended product.

3. A process for producing a blended calcium sulfate-zinc sulfide pigment, comprising subjecting calcium sulfate containing less combined water than the dihydrate to hydration in the presence of a zinc-containing pigment, maintaining the hydrating mixture in a relatively viscous state, during and until completion of said hydration subjecting said mixture to mechanical shearing action, and subsequently calcining the resultant product within substantially 30 minutes from completion of said mechanical shearing treatment.

4. A process for directly producing a blended pigment, comprising mixing calcium sulfate containing less combined water than a dihydrate, a prime white pigment and water, the water being present in amount sufficient to maintain the resultant mixture in a substantially paste-like and thickened consistency, during and until completion of hydration of said calcium sulfate subjecting the mixture to mechanical shearing treatment, and thereafter dehydrating the resultant product within substantially 30 minutes from completion of said mechanical treatment.

5. A process for directly producing a blended calcium sulfate-zinc sulfide pigment during concurrent hydration of said calcium sulfate, comprising mixing a calcium sulfate hemihydrate, zinc sulfide and water, the latter ranging in amount from substantially 3-7 times the weight of total solids present in the mixture, during and until completion of calcium sulfate hydration subjecting the mixture to mechanical treatment involving shearing forces, and dehydrating the resultant blended product within substantially 30 minutes from completion of said mechanical treatment.

6. A process for directly producing a blended calcium sulfate-zinc sulfide pigment during hydration of said calcium sulfate, comprising mixing calcium sulfate hemihydrate, zinc sulfide and water, said water being in amount ranging from substantially 3-7 times the weight of total solids present in the mixture, during and until completion of hydration of said hemihydrate subjecting the mixture while in a relatively viscous state to mechanical kneading, and drying and recovering the resultant composite pigment within substantially 30 minutes from completion of said mechanical kneading.

MARION L. HANAHAN.
RODOLPHE A. GAGNON.